United States Patent
Van Wyck Loomis

(10) Patent No.: US 8,566,034 B1
(45) Date of Patent: *Oct. 22, 2013

(54) INCLINOMETER WITH CALIBRATION

(75) Inventor: Peter Van Wyck Loomis, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 530 days.

This patent is subject to a terminal disclaimer.

(21) Appl. No.: 12/928,038

(22) Filed: Dec. 2, 2010

Related U.S. Application Data

(63) Continuation-in-part of application No. 12/157,577, filed on Jun. 11, 2008, now Pat. No. 8,150,651.

(51) Int. Cl.
*G06F 15/00* (2006.01)
*G01P 15/00* (2006.01)

(52) U.S. Cl.
USPC ............... 701/480; 701/494; 702/96; 702/95; 702/141; 702/150

(58) Field of Classification Search
USPC .......... 342/357.14, 357.06; 702/154, 96, 141; 701/70, 34, 41
See application file for complete search history.

(56) References Cited

U.S. PATENT DOCUMENTS

| | | | |
|---|---|---|---|
| 2,659,985 A | 8/1947 | Cloud | |
| 4,586,138 A | 4/1986 | Mullenhoff et al. | |
| 5,416,712 A | 5/1995 | Geier et al. | |
| 5,446,658 A | 8/1995 | Pastor et al. | 701/1 |
| 5,809,434 A | 9/1998 | Ashrafi et al. | 701/1 |
| 6,122,568 A | 9/2000 | Madau et al. | 701/1 |
| 6,170,594 B1 | 1/2001 | Gilbert | 160/282 |
| 6,202,009 B1 | 3/2001 | Tseng | 701/30.3 |
| 6,282,496 B1 | 8/2001 | Chowdhary | 701/220 |
| 6,374,172 B1 | 4/2002 | Yamaguchi et al. | 701/90 |
| 6,580,980 B1 | 6/2003 | Gauthier et al. | 701/29 |
| 6,694,260 B1 | 2/2004 | Rekow | 701/214 |
| 6,714,851 B2* | 3/2004 | Hrovat et al. | 701/70 |
| 6,856,885 B2 | 2/2005 | Lin et al. | 701/70 |
| 6,856,886 B1 | 2/2005 | Chen et al. | 701/70 |
| 7,032,450 B2 | 4/2006 | Lee et al. | 73/488 |
| 7,194,341 B2 | 3/2007 | Altenkirch | 701/1 |

(Continued)

FOREIGN PATENT DOCUMENTS

| | | |
|---|---|---|
| EP | 1 213 561 A1 | 6/2002 |
| EP | 2 034 270 A1 | 3/2009 |

(Continued)

OTHER PUBLICATIONS

PCT, International Preliminary Report on Patentability dated Dec. 23, 2010 for PCT/US2009/040659 based on U.S. Appl. No. 12/157,577, 6 pages.

(Continued)

*Primary Examiner* — Thomas Black
*Assistant Examiner* — Wae Louie
(74) *Attorney, Agent, or Firm* — David R. Gildea

(57) ABSTRACT

An inclinometer using a forward speed, a yaw angle rate, a forward acceleration and external altitude information in order to calculate an inclination angle. The inclinometer performs an automatic calibration of an accelerometer bias. The inclinometer may also perform an automatic calibration of an accelerometer position offset. The external altitude information is not required to be continuous.

20 Claims, 14 Drawing Sheets

(56) References Cited

U.S. PATENT DOCUMENTS

| | | | |
|---|---|---|---|
| 7,289,898 B2 | 10/2007 | Hong et al. | 701/96 |
| 7,366,598 B2 | 4/2008 | Ono et al. | 701/34 |
| 7,430,460 B2 | 9/2008 | Price | 701/3 |
| 7,650,252 B2 * | 1/2010 | Douglas | 702/95 |
| 7,681,960 B2 | 3/2010 | Wanke et al. | 303/146 |
| 7,690,556 B1 | 4/2010 | Kahn et al. | 235/105 |
| 7,734,407 B2 | 6/2010 | Asano | 701/70 |
| 7,774,103 B2 | 8/2010 | Deng et al. | 701/1 |
| 7,856,336 B2 * | 12/2010 | Van Wyck Loomis | 702/141 |
| 7,970,512 B2 * | 6/2011 | Lu et al. | 701/41 |
| 8,150,651 B2 * | 4/2012 | Loomis | 702/154 |
| 8,200,452 B2 | 6/2012 | Ueda et al. | 702/141 |
| 2003/0130778 A1 | 7/2003 | Hrovat et al. | 701/45 |
| 2005/0085950 A1 | 4/2005 | Altenkirch | 701/1 |
| 2006/0074540 A1 | 4/2006 | Braunberger et al. | |
| 2007/0038356 A1 | 2/2007 | Braunberger et al. | |
| 2009/0309793 A1 * | 12/2009 | Loomis | 342/357.14 |
| 2009/0312975 A1 * | 12/2009 | Wyck Loomis | 702/96 |
| 2009/0326858 A1 * | 12/2009 | Ueda et al. | 702/141 |
| 2011/0077898 A1 * | 3/2011 | Loomis | 702/141 |

FOREIGN PATENT DOCUMENTS

| | | | |
|---|---|---|---|
| JP | 63-275913 | 11/1988 | |
| JP | 63275913 A | 11/1988 | G01C 9/08 |
| JP | 3165265 | 7/1991 | |
| JP | 07-083659 A | 3/1995 | |
| JP | 2007-221843 A | 8/2007 | |

OTHER PUBLICATIONS

USPTO Office action for U.S. Appl. No. 12/157,577 dated Dec. 28, 2011, 5 pages.
PRC Patent Office action #2 dated Sep. 6, 2012 for PRC application 200980122031.1 based on U.S. Appl. No. 12/577,157.
English language summary of PRC Patent Office action #2 dated Sep. 6, 2012 for PRC application 200980122031.1 based on U.S. Appl. No. 12/577,157.
People's Republic of China, First Office Action, App. No. 200910145593.X Feb. 15, 2011, 6 pages.
Summary of 1st office action of CN200980122031.1 based on U.S. Appl. No. 12/157,577, U.S. Patent 8,150,651 B2.
USPTO office action dated Jun. 20, 2012 for U.S. Appl. No. 13/339,539.
USPTO action mailed Sep. 7, 2011 for U.S. Appl. No. 12/157,577, 22 pages.
Korean Office action dated Aug. 29, 2011 for Korean App. No. 10-2009-0046543, 4 pages.
USPTO action papers for patent U.S. Appl. No. 13/399,539 mailed Aug. 15, 2012.
USPTO action papers for patent U.S. Appl. No. 13/399,539 mailed Nov. 2, 2012.
USPTO action papers for U.S. Appl. No. 13/402,018 mailed Nov. 21, 2012.
PCT, International Search Report, PCT/US2009/040659, mailed Aug. 14, 2009, 49 pages.
Elliot Kaplan & Christopher Hegarity editors, "Understanding GPS: Principles and Applications" 2nd edition, chapter 9.3 "Sensor Integration in land vehicles" 2 cover pages chapter 9.3 Sensor Integration in land vehicle systems, 2 cover and 491-523 pages.
USPTO Office Action, U.S. Appl. No. 12/157,519, dated Jun. 22, 2010, 19 pages.
USPTO Office Action, U.S. Appl. No. 12/157,519, dated Sep. 2, 2010, 7 pages.
USPTO action on U.S. Appl. No. 12/927,005 publication 2011/0077898 mailed by the USPTO Jun. 7, 2013.

* cited by examiner

INCLINOMETER WITH CALIBRATION

CROSS REFERENCE TO RELATED APPLICATIONS

This application is a continuation in part of pending application Ser. No. 12/157,577 by the same inventor filed Jun. 11, 2008 now U.S. Pat. No. 8,150,651 and assigned to the same assignee.

BACKGROUND

1. Field of the Application

The present disclosure relates generally to dead reckoning systems and more particularly to a dead reckoning altimeter apparatus using a speedometer and a forward-looking accelerometer for measuring changes in altitude. The present disclosure also relates particularly to an inclinometer apparatus using a speedometer and a forward-looking accelerometer for measuring inclination angle.

2. Description of the Background Art

Dead reckoning (DR) is the process of estimating one's current position based upon a previously determined position and advancing that position based upon measured speed, direction and/or acceleration. The DR begins with an initial known position, or fix. The fix can be determined using ranging, triangulation or map matching. It is common to use radio signals for ranging from the global navigation satellite system (GNSS) for establishing an initial position fix from which to start dead reckoning.

Dead reckoning speed can be measured by many methods. Before modern instrumentation, DR speed was determined aboard ship by throwing a wood float, called a log, overboard and counting the knots on a line tied to the float that passed a sailor's hand in a sandglass measured time as the ship moved forward through the water. More modern ships use engine rpm, automatic logs for measuring water speed, or bottom looking Doppler sonar. Road vehicles typically measure speed by measuring revolution rates of their wheels. Road vehicles can also use engine rpm and Doppler sonar or radar for speed measurement. The horizontal direction can be measured with a magnetic or flux gate compass. Dead reckoning direction can also be determined by integrating the rate of change of angles sensed by an angular rate sensor. An angular rate sensor is sometimes referred to as a gyro. Inertial systems that integrate directional linear accelerations can be used for dead reckoning, especially for aircraft.

Even with the advancement of the convenience and accuracy of the global navigation satellite system (GNSS), there continues to be a need for dead reckoning for cases when continuous GNSS fixes cannot be obtained or are noisy. Further, global navigation satellite system positioning tends to be less accurate and noisier for altitude and vertical heading angles than for horizontal positions and horizontal heading angles.

SUMMARY

The present disclosure describes an apparatus and method for measuring changes in altitude by measuring forward motion. The present disclosure also describes an apparatus and method for determining incline angle by measuring forward motion.

One embodiment is a dead reckoning altimeter having a speedometer to determine forward speed; an accelerometer to measure forward acceleration; and a DR calculator to calculate an altitude change based on the speed and the measured acceleration. The altimeter may also include a yaw rate sensor to measure yaw angle rate, and a yaw compensator to compensate the measured acceleration according to the yaw angle rate where the DR calculator is configured to use the compensated acceleration with the speed for calculating the altitude change.

Another embodiment is a method for dead reckoning altitude, comprising determining forward speed, measuring forward acceleration, and calculating an altitude change based on the speed and the measured acceleration. The method may also include measuring yaw angle rate, compensating the measured acceleration according to the yaw angle rate, and using the compensated acceleration with the speed for calculating the altitude change.

Another embodiment is an inclinometer having a speedometer to determine forward speed; an accelerometer to measure forward acceleration; and an incline angle calculator to calculate an incline angle based on the rate of change of the speed and the measured acceleration. The inclinometer may also include a yaw rate sensor to measure yaw angle rate and a yaw compensator configured to use the yaw angle rate to compensate the measured acceleration where the incline angle calculator is configured to use the compensated acceleration with the rate of change of speed to calculate the incline angle.

Another embodiment is a method for determining incline angle, comprising determining forward speed; measuring forward acceleration, and calculating an incline angle based on the measured acceleration and a rate of change of the speed. The method may also include measuring yaw angle rate, compensating the measured acceleration according to the yaw angle rate, and using the compensated acceleration with the rate of change of speed for calculating the incline angle.

In an embodiment a change in altitude is determined based on a forward speed and a forward acceleration.

In an embodiment an incline angle is determined based on a rate of change of forward speed and a forward acceleration.

In an embodiment a measured acceleration is compensated for a yaw angle rate.

In an embodiment a measured acceleration is compensated for a yaw angle rate according to a linear position offset.

In an embodiment a linear position offset is determined based on returns to position having opposite direction loops.

In an embodiment a measured acceleration is compensated for a yaw angle rate according to a yaw alignment angle.

In an embodiment a yaw alignment angle is determined based on returns to position having opposite direction loops.

In an embodiment a measured acceleration is compensated for an accelerometer bias.

In an embodiment an installation accelerometer bias is determined based on returns to position having opposite facing directions.

In an embodiment a restart accelerometer bias is determined based on a last incline angle.

In an embodiment an updated accelerometer bias is calibrated based on differences between external altitude fixes and dead reckoned altitudes.

In another embodiment an estimator is used to calibrate an accelerometer bias.

In another embodiment an estimator is used to calibrate an accelerometer position offset.

These and other embodiments and attributes will no doubt become obvious to those of ordinary skill in the art after reading the following detailed descriptions and viewing the various drawings.

DETAILED DESCRIPTION

The details of several embodiments will now be presented. It should be understood that various details of the embodiments can be combined but it is not necessary to employ all of the various details of these embodiments in order to carry out the idea of the invention.

Figure 1A:
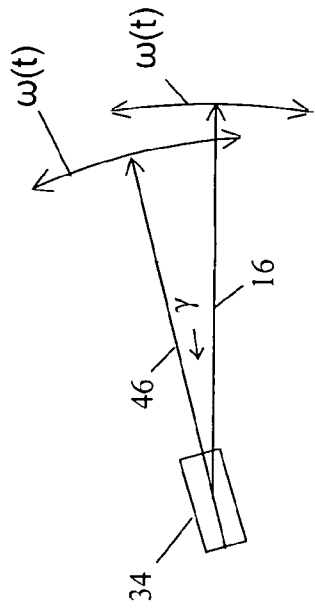
FIG. 1A illustrates a yaw alignment angle for an accelerometer of the dead reckoning altimeter and the inclinometer of FIG. 1.
Figure 1:
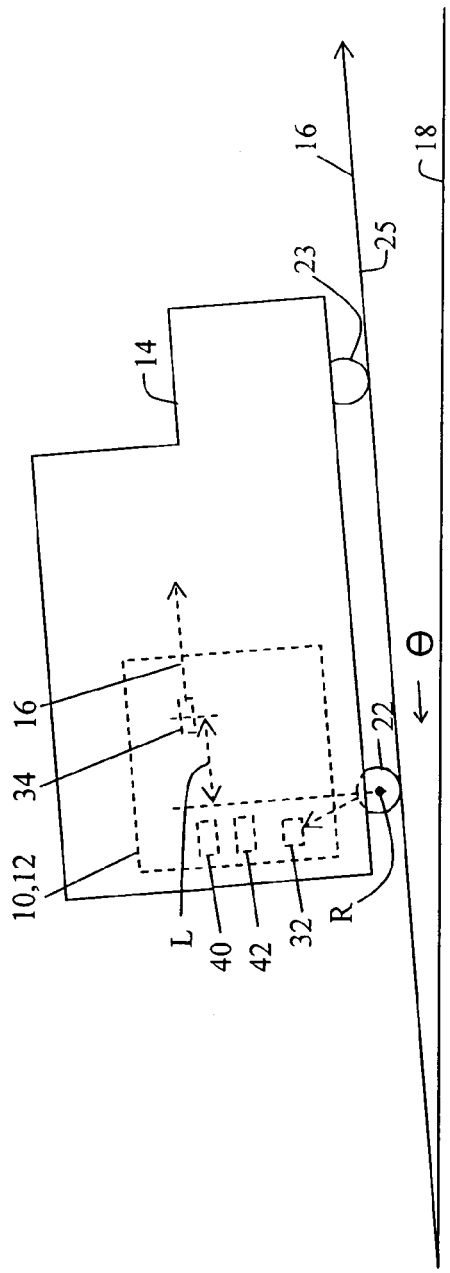
FIG. 1 illustrates a vehicle carrying a dead reckoning altimeter and an inclinometer.

FIG. 1 shows a dead reckoning (DR) altimeter apparatus and an inclinometer apparatus referred to with reference numbers 10 and 12, respectively. The apparatus 10,12 is intended to be carried in a vehicle 14 where the vehicle 14 has a forward motion direction 16 having an unknown incline angle θ from the horizontal plane 18. The vehicle 14 can be an automobile, truck, train, trolley or the like having rear wheels 22 and front wheels 23 on the ground 25.

The apparatus 10,12 includes a speedometer 32 and a forward-looking linear accelerometer 34. The vehicle 14 has a turn radius line R (FIG. 5) perpendicular to the vehicle 14 through a turn center 92 (FIG. 5) of the vehicle 14. For a vehicle 14 that turns with the front wheels 23 the turn radius line R passes approximately through the axle of the rear wheels 22. The accelerometer 34 has an installation linear position offset L with respect to the turn radius line R. The linear position offset L is illustrated in the forward direction 16.

Figure 2:
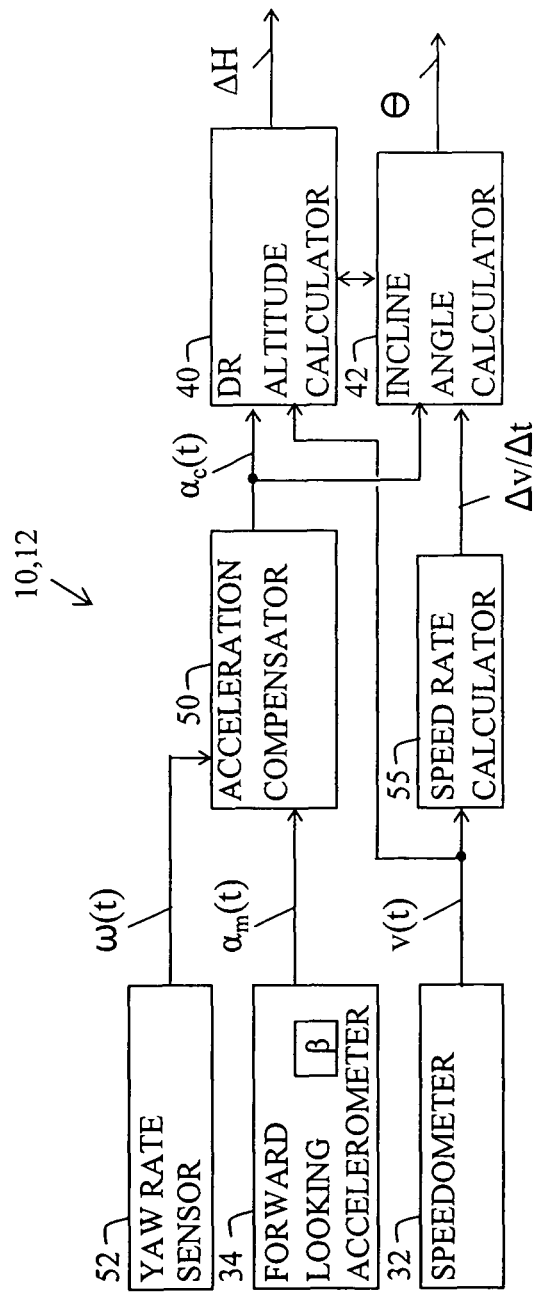
FIG. 2 is a block diagram of the dead reckoning altimeter and the inclinometer of FIG. 1.

The DR altimeter apparatus 10 includes a DR altitude calculator 40 (FIG. 2). The inclinometer apparatus 12 includes an incline angle calculator 42 (FIG. 2). The speedometer 32 may be a speed measuring device or a distance measuring device with the inclusion of a computation device for computing a forward speed v(t) based on the measured distance over a known period of time. The speedometer 32 may be a tachometer or odometer for measuring distance and then computing the speed v(t) in the forward direction 16 based on counting revolutions of rear or front wheels 22,23 over a time period. Or, the speedometer 32 may measure the forward speed v(t) for the vehicle 14 with Doppler radar or sonar or optical measurements from signals reflected off the ground 25. For example an airplane may use the apparatus 10,12 with the speedometer 32 calculating the speed v(t) based on Doppler. The accelerometer 34 may be a single axis device mounted for measuring acceleration $\alpha_m(t)$ in the forward direction 16, or may be a two of three axis device that measures the acceleration $\alpha_m(t)$ in the forward direction 16 by using a linear combination of two or three axis linear acceleration measurements.

FIG. 1A shows a physical mounting of the accelerometer 34 having a measurement direction 46 with a yaw alignment angle γ with respect to the forward direction 16 of the vehicle 14. In a simple case the measurement direction 46 is the same as the forward direction 16. However, the sensor for the accelerometer 34 may be mounted so that the measurement direction 46 differs from the forward direction 16 in the horizontal plane by the yaw alignment angle γ.

FIG. 2 is a block diagram of the dead reckoning altitude apparatus 10 and the inclinometer apparatus 12 having the DR altitude calculator 40 and the incline angle calculator 42. The apparatus 10,12 includes an acceleration compensator 50 and a yaw rate sensor 52. The yaw rate sensor 52 measures a yaw angle rate ω(t). The acceleration compensator 50 compensates the measured acceleration $\alpha_m(t)$ for the effect of the yaw angle rate ω(t) and the effect of an accelerometer bias β for determining a compensated acceleration $\alpha_c(t)$.

The DR altitude calculator 40 uses the forward speed v(t) and the compensated forward acceleration $\alpha_c(t)$ for calculating an altitude change ΔH. The incline angle calculator 42 includes a speed rate calculator 55 using the speed v(t) to determine a rate of change of speed Δv/Δt versus time and then uses the speed rate Δv/Δt with the compensated forward acceleration $\alpha_c(t)$ for calculating the incline angle θ.

Figure 3:
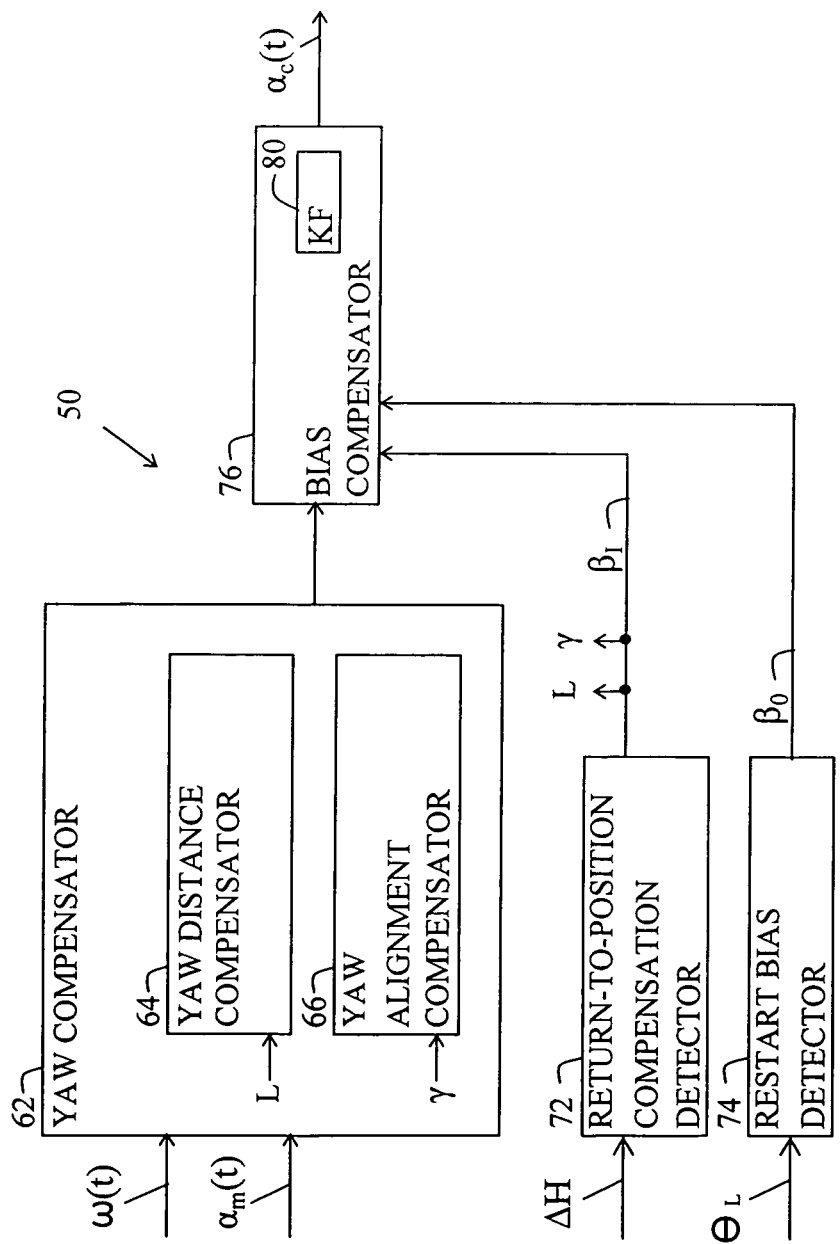
FIG. 3 is a block diagram of an acceleration compensator of the dead reckoning altimeter and the inclinometer of FIG. 1.

FIG. 3 is a functional block diagram acceleration compensator 50. The acceleration compensator 50 includes a yaw compensator 62 including a yaw distance compensator 64 and a yaw alignment compensator 66. The yaw distance compensator 64 uses the measured yaw angle rate ω(t) and the offset L to calculate a position offset acceleration measurement error that occurs when the vehicle 14 is turning (yawing), and compensates the measured acceleration $\alpha_m(t)$ for this error. The position offset error is calculated as $\omega^2(t) \times L$. The yaw alignment compensator 66 uses the measured yaw angle rate ω(t), the speed v(t) and the yaw alignment angle γ to calculate a yaw alignment angle acceleration measurement error that occurs when the vehicle 14 is turning (yawing), and compensates the measured acceleration $\alpha_m(t)$ for this error. The yaw alignment angle error is calculated as $\omega(t) \times v(t) \times \gamma$.

The acceleration compensator 50 also includes a return-to-position compensation detector 72, a restart bias detector 74, and an accelerometer bias compensator 76.

The compensation detector 72 tracks altitude changes ΔH's between triggers, and determines an installation accelerometer bias $\beta_I$ for the sum of the altitude changes ΔH's between the triggers to be zero, or for a return altitude $H_R$ to be equal to a start altitude $H_1$. In order to eliminate the effect of parking place pitch angle, the vehicle 14 may be parked facing opposite directions for determinations of altitudes $H_R$ and $H_1$. The accelerometer bias $\beta_I$ is determined that results in the zero sum altitude changes $\Delta H$'s. The trigger can be automatic (preferably after a manual enablement) when the apparatus 10,12 senses that the horizontal position has returned, or manual when an operator knows he has returned to the same position. In order to determine the combination of the accelerometer bias $\beta_I$, the linear position offset L and the yaw alignment angle $\gamma$, the vehicle 14 is driven to loop back to the start position in a least once in a clockwise loop and at least once in a counterclockwise loop. These operations are illustrated in the flow charts of FIG. 8 and FIGS. 7B and 7C and described in the accompanying detailed descriptions.

The restart bias detector 74 uses the two ideas that the speed $v(t)$ is still very nearly zero at the start of motion of the vehicle 14 and the incline angle $\Theta$ at the start of motion is the very nearly the same as the last incline angle $\Theta_L$ when the vehicle 14 was last in motion before stopping. Accordingly, a restart accelerometer bias $\beta_o$ is estimated with an equation 1. In the equation 1 the acceleration $\alpha$ is preferably taken after acceleration compensation for yaw angle rate $\omega(t)$. The g is the constant acceleration due to gravity.

$$\beta_0 = \alpha - g \sin \theta_L \qquad 1)$$

The accelerometer bias $\beta$ may change rapidly when the apparatus 10,12 is warming up after being in an unpowered state. There may be a long warm up period before the accelerometer bias $\beta$ is stable enough to be accurately calibrated. This problem can be mitigated according to the equation 1 by determining the restart accelerometer bias $\beta_0$ using an assumption that the incline angle $\theta_L$ immediately at start of motion has not changed from the incline angle $\theta_L$ that was last calculated for the last motion before stopping and assuming that the speed $v(t)$ immediate at the start of motion is zero.

The accelerometer bias compensator 76 uses the installation bias $\beta_I$ and/or the restart bias $\beta_o$ and/or the bias $\beta$ determined by comparisons with external navigation information for compensating the measured acceleration $\alpha_m(t)$. A Kalman filter 80 (FIG. 4) may be included as a part of the accelerometer bias compensator 76 in order to make continuously better estimates of the bias $\beta$. The bias compensator 76 may include a bias switch to switch between the installation accelerometer bias $\beta_I$, the restart accelerometer bias $\beta_0$ and the new calibrated accelerometer bias $\beta$ when the Kalman filter obtains new calibrations.

A small vertical misalignment angle of the accelerometer 34 acts with gravity g to change the measurement of acceleration $\alpha_m(t)$ by a near-constant gravity bias term of $g \times \sin$ (vertical misalignment angle). This gravity bias term effectively adds (or subtracts) with the accelerometer bias $\beta$ that is determined and compensated.

Figure 4:
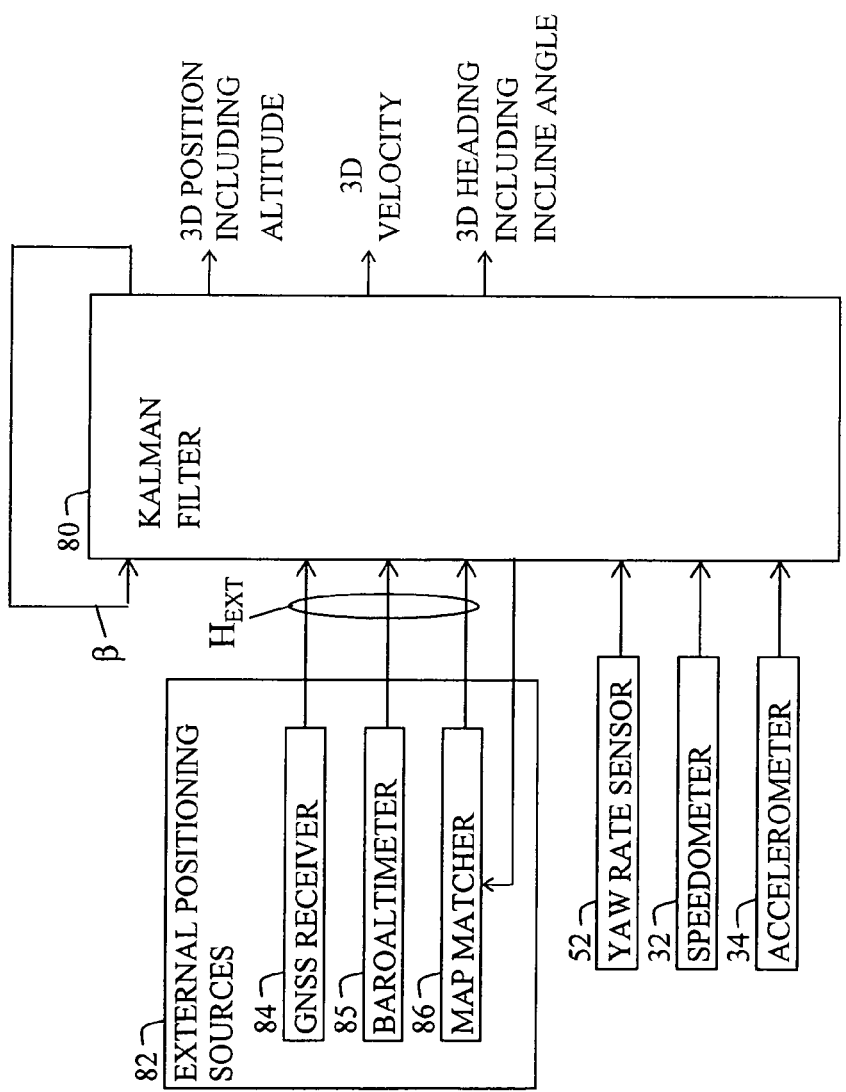
FIG. 4 is a block diagram of the dead reckoning altimeter and the inclinometer of FIG. 1 having a Kalman filter for improving the accuracies of three dimensional positions, velocities and headings.

FIG. 4 is a block diagram of the apparatus 10,12 having a Kalman filter 80 and one or more external positioning sources 82. Exemplary external sources 82 include but are not limited to a global navigation satellite system (GNSS) receiver 84, a baro-altimeter 85 and a map matcher 86. The GNSS receiver 84 receives and processes GNSS signals for providing GNSS-based positioning information such as three dimensional position including a GNSS-based external altitude fix $H_{EXT}$, time, three dimensional velocity, three dimensional heading including incline angle, satellite signal Dopplers and satellite pseudoranges. The baro-altimeter 85 provides an air pressure based external altitude fix $H_{EXT}$. The map matcher 86 uses the position and heading from the GNSS receiver 84 or the output of the Kalman filter 80 for providing a map adjusted position to match a position on a road or track to a line on an electronic map and match the left or right side of the road or track according to the direction heading information. The map matcher 86 then provides its best map matched estimate of the position along the road or track or line. The position along the road or track or line may have a map based altitude $H_{EXT}$ as on a topographic map that can be used by the Kalman filter 80.

The speedometer 32, the accelerometer 34, and the yaw rate sensor 52 provide speed $v(t)$, measured acceleration $\alpha_m(t)$, and yaw angle rate $\omega(t)$ to the Kalman filter 80. The Kalman filter 80 filters the differences between the noisy and/or discontinuous external altitude fixes $H_{EXT}$'s at its input and its dead reckoning altitudes H's at its output, where the dead reckoning altitude H is determined by accumulating altitude changes $\Delta H$'s. The filtered differences are used in feedback loops to provide a calibrated version of the accelerometer bias $\beta$. The Kalman filter 80 may be stored on a tangible medium as computer-readable instructions for directing a computer device, such as the apparatus 10,12 to carry out the instructions.

The filter 80 uses whatever information is available that might include, but is not limited to, accelerometer bias $\beta$, altitude changes $\Delta H$'s, speed $v(t)$ from the speedometer 32 (or distance $\Delta S$ from the speedometer 32 from which the speed $v(t)$ can be computed from $\Delta S/\Delta t$), the measured forward acceleration $\alpha_m(t)$ (or a partially compensated acceleration or a fully compensated acceleration $\alpha_c(t)$), and positioning navigation information from the external sources 82 including but not limited to the external altitude $H_{EXT}$. The Kalman filter 80 uses this information for computing three dimensional position including altitude H, three dimensional velocity, and three dimensional heading including incline angle $\theta$.

The Kalman filter 80 uses several navigation inputs of varying continuity and accuracy for providing continuously updated best estimates for 3D heading, 3D position and 3D velocity. The navigation inputs may include, but are not limited to, barometric pressure, GNSS satellite pseudoranges and Dopplers from the GNSS receiver 84 map matching for latitude, longitude and external altitude $H_{EXT}$, map matching for heading, the yaw rate sensor 52 that may be a gyro for measuring the yaw angle rate $\omega(t)$, the speed $v(t)$ or distance S measurements from the speedometer 32, and the forward acceleration $\alpha_m(t)$ measurements by the accelerometer 34. The GNSS receiver 84 can be a Global Positioning System (GPS) receiver.

Internal or hidden operation of the Kalman filter 80 provides accelerometer bias $\beta$ calibration that is used for compensating the measured acceleration $\alpha_m(t)$, and correcting and/or smoothing the heading, position and velocity outputs. The Kalman filter 80 operates in a similar manner to the Kalman filter described in U.S. Pat. No. 5,416,712 by Geier et al. for a "position and velocity estimation system for adaptive weighting of GPS and dead reckoning information", the teachings of which are incorporated by reference in this application. Further understanding the filtering technology of the Kalman filter 80 is provided by Elliot Kaplan and Christopher Hegarty in "Understanding GPS: principles and applications", 2nd edition, published by Artech House, Inc. of Norwood, Mass., copyright 2006, ISBN 1-58053-894-0. Chapter 9.3 on sensor integration in land vehicles, written by Geier et al., is especially instructive.

Figure 5:
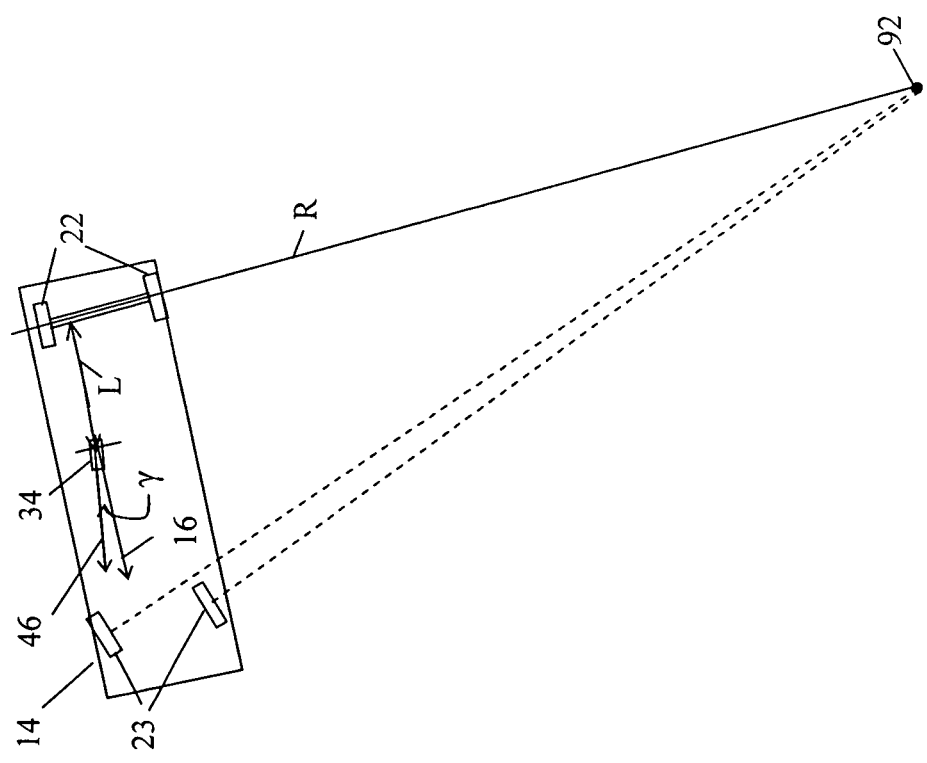
FIG. 5 illustrates an accelerometer position offset and a yaw alignment angle for the dead reckoning altimeter and the inclinometer of FIG. 1.

FIG. 5 illustrate the position offset L in the forward direction 16 between the accelerometer 34 and the turn radius line R perpendicular to the vehicle 14 that passes through the turn center 92 of the vehicle 14. For a vehicle 14 that uses the front wheels 23 for turning, the turn radius line R passes approximately through the axle for the rear wheel 22. The yaw alignment angle $\gamma$ is the angle between the forward direction 46 of the accelerometer 34 and the forward direction 16 of the vehicle 14.

Figure 6:
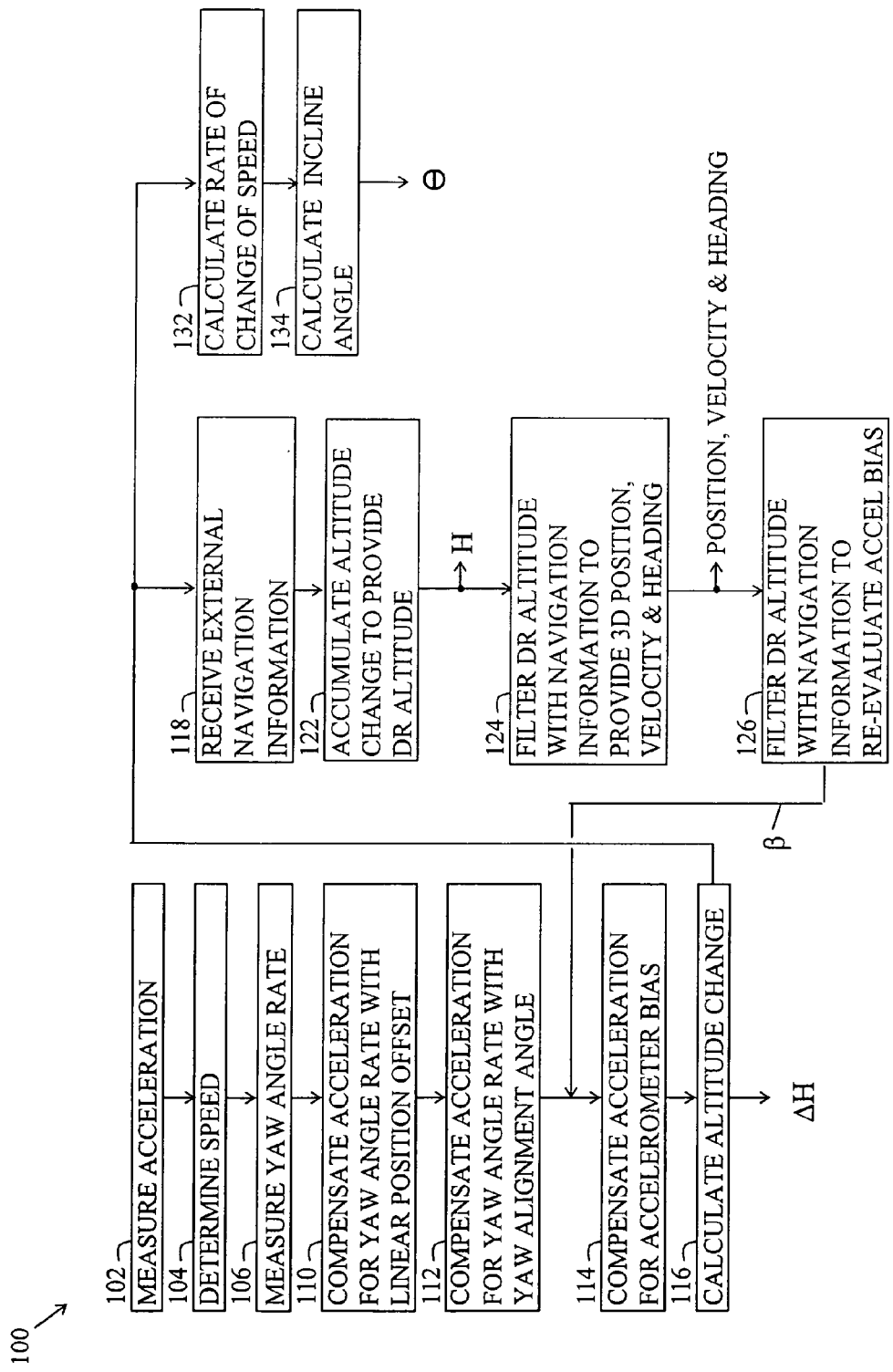
FIG. 6 is a flow chart of a method for determining altitude change and inclination angle and dead reckoning position, velocity and heading.

FIG. 6 is a flow chart of a method for determining altitude change $\Delta H$ and inclination angle $\theta$. The steps of the method may be stored on a tangible medium 100 in a computer-readable form to be read by a computer for carrying out the steps. The apparatus 10,12 may function, operate and run as a computer for carrying out this steps. In a step 102 acceleration $\alpha_m(t)$ is measured. In a step 104 speed $v(t)$ is determined. In a step 106 yaw angle rate $\omega(t)$ is measured. In steps 110 and 112 the acceleration $\alpha_m(t)$ is compensated for the effects of yaw rate $\omega(t)$. In the step 110 acceleration is compensated for the linear position offset L as a function of the yaw angle rate $\omega(t)$. In the step 112 acceleration is compensated for yaw alignment angle $\gamma$ as a function of the yaw angle rate $\omega(t)$ and the speed $v(t)$. In a step 114 acceleration is compensated for the accelerometer bias $\beta$. In an installation calibration, the accelerometer bias $\beta$ may be determined from a return to position method (FIG. 8) as the accelerometer bias $\beta_I$. At a restart, the accelerometer bias $\beta$ may be calculated (FIG. 7A) from the last incline angle $\theta_L$ as the accelerometer bias $\beta_o$.

An altitude change $\Delta H$ is calculated in a step 116 from the speed $v(t)$ and the compensated acceleration $\alpha_c(t)$. In a step 118 external positioning information such as positions, pseudoranges, altitudes, Dopplers and headings are received from external positioning sources 82. In a step 122 the altitude changes $\Delta H$ are accumulated to provide a DR altitude H. For continuous operation the DR altimeter 10 accumulates a sequence of altitude changes $\Delta H$'s to the last previous DR altitude H for providing a continuous sequence of DR altitudes H's. In a step 124 the DR altitude H is filtered based on the external positioning information with Kalman filtering techniques for calculating three dimensional position including the altitude H, three dimensional velocity and three dimensional heading including the incline angle $\Theta$. In a step 126 the accelerometer bias is re-calculated with Kalman filtering techniques using the DR altitude H and the external positioning information then applied for updating the accelerometer bias $\beta$ used for providing the compensated acceleration $\alpha_c(t)$. The steps 124 and 126 are normally performed together with states of the Kalman filtering technique.

The rate of change of speed $\Delta v/\Delta t$ is calculated in a step 132 from the speed $v(t)$ and time. In a step 134 the incline angle $\Theta$ is calculated from the compensated acceleration $\alpha_c(t)$ and the rate of change of speed $\Delta v/\Delta t$ using an equation 4 below.

Figures 7A, 7B, 7C:
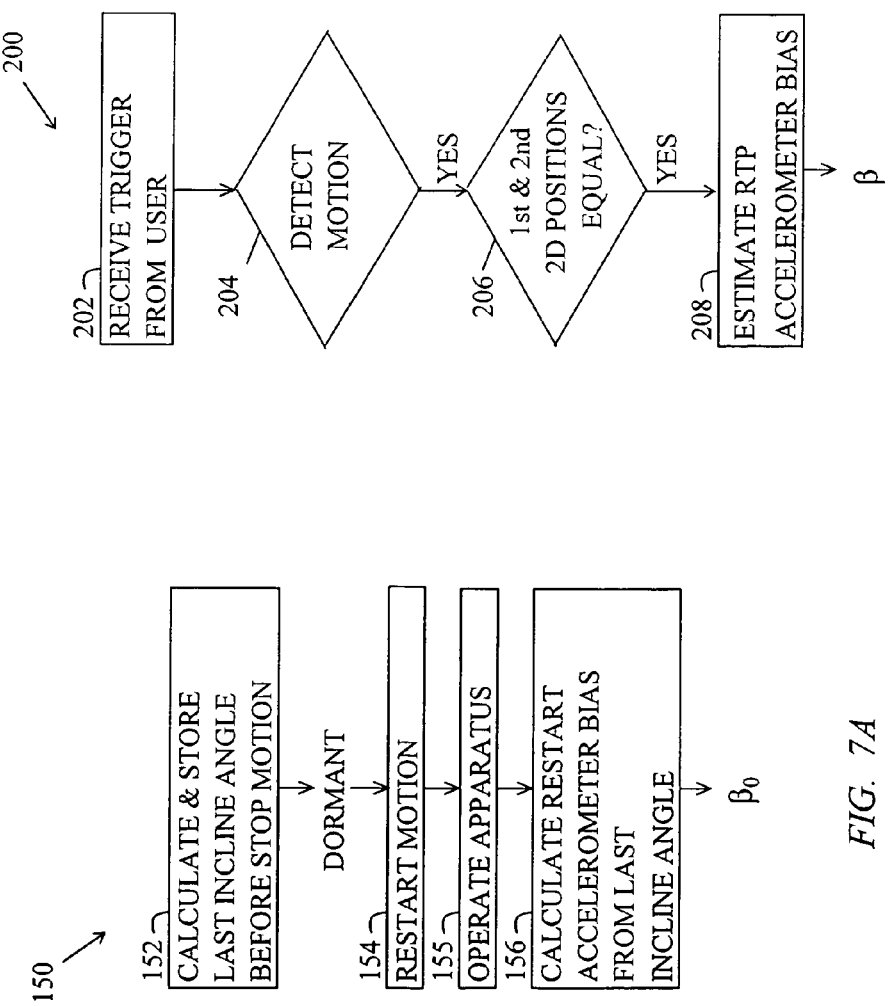
FIG. 7A is a flow chart of a method for determining an accelerometer bias calibration for a restart.
FIG. 7B is a flow chart of a return-to-position method for determining an accelerometer bias calibration.
FIG. 7C is a diagram of vehicle travel where a counter rotation loop is used for determining an accelerometer bias calibration for the dead reckoning altimeter and the inclinometer of FIG. 1.

FIG. 7A is a flow chart of a method for calculating the restart accelerometer bias $\beta_o$. The steps of the method may be stored on a tangible medium 150 in a computer-readable form to be read by a computer for carrying out the steps. The apparatus 10,12 may function, operate and run as a computer for carrying out this steps. In a step 152 the incline angles $\Theta$'s are calculated. When the apparatus 10,12 is powered down, the last incline angle $\theta_L$ that was calculated is stored.

The apparatus 10,12 is powered down in a dormant or turned off state for an arbitrary period of time. In a step 154 the apparatus 10,12 is turned on and starts motion. In a step 155 the apparatus 10,12 operates for measuring the acceleration $\alpha_m(t)$ and compensating the measured acceleration $\alpha_m(t)$ for yaw angle rate $\omega(t)$ in order to provide the acceleration a in the equation 1 above. In a step 156 the restart accelerometer bias $\beta_o$ is calculated in the equation 1 from the incline angle $\theta_L$.

FIG. 7B is a flow chart of an embodiment of a return-to-position calibration method. The steps of the method may be stored on a tangible medium 200 in a computer-readable form to be read by a computer for carrying out the steps. The apparatus 10,12 may function, operate and run as a computer for carrying out this steps. In a step 202 a return-to-position trigger is received from a user and the apparatus 10,12 determines its position and a first altitude $H_1$. In a step 204 the apparatus 10,12 detects that it is moving. In a step 206 a return loop altitude $H_R$ is determined when the apparatus 10,12 determines that it has returned to the same two dimensional horizontal position within a threshold of one to three meters within a predetermined range of time. The length of time may be in the range of a few seconds to a few minutes. Alternatively, a return loop altitude $H_R$ is measured when a second trigger is received.

In a simple case a driver issues a trigger to the apparatus 10,12 when the vehicle 14 parked and then drives in a loop back to the same parked location. The method makes the assumption that the return loop altitude $H_R$ is the same as the start altitude $H_1$ when it detects that the apparatus 10,12 has returned to the same horizontal position or is triggered a second time. In a step 208 the apparatus 10,12 determines the accelerometer bias $\beta$ that causes the sum of the altitude changes $\Delta H$'s to be zero or determines the accelerometer bias 3 that cause the start altitude $H_1$ and return loop altitude $H_R$ to be equal.

FIG. 7C is a diagram of vehicle travel for return to position calibration. The vehicle 14 starts at a position 250, travels in a counterclockwise loop 252 back to the start position 250 for a single loop calibration. For a double loop calibration the vehicle 14 continues through a clockwise loop 254 back to the start position 250. Either the counterclockwise loop 252 or the clockwise loop 254 can be first. Either or both of the loops 252 and 254 may be repeated any number of times and the results averaged and the loops are not required to be exactly circular.

Figure 8:
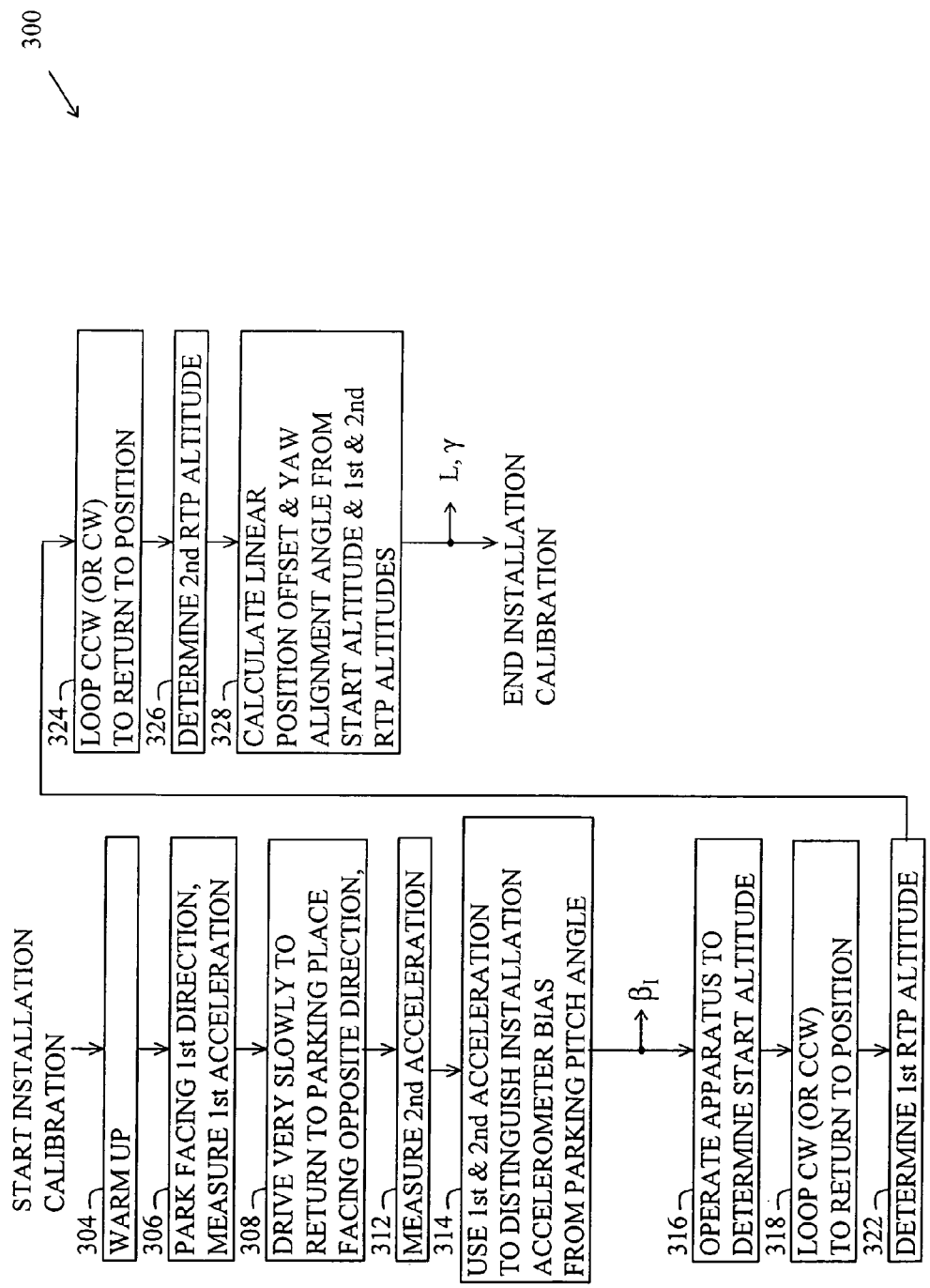
FIG. 8 is a flow chart of a return-to-position initial installation method for determining an accelerometer bias, a linear position offset and a yaw alignment angle for the dead reckoning altimeter and the inclinometer of FIG. 1 and the method of FIG. 6.

FIG. 8 is a flow chart of a double loop installation calibration using a return to position method for determining installation value $\beta_I$ for accelerometer bias $\beta$, and values for a linear position offset L, and a yaw alignment angle $\gamma$. The steps of the method may be stored on a tangible medium 300 in a computer-readable form to be read by a computer for carrying out the steps. The apparatus 10,12 may function, operate and run as a computer for carrying out this steps. In a step 304 the apparatus 10,12 is warmed up. The warm up stabilizes the accelerometer bias $\beta$. In a step 306 the vehicle 14 is parked facing a first direction. A first acceleration $\alpha_m(t)$ is measured. This measured acceleration $\alpha_m(t)$ will be small because the vehicle 14 is not moving.

The vehicle 14 is slowly driven in a step 308 to return to the same parking space and stopped facing in the opposite direction. A second acceleration $\alpha_m(t)$ is measured. This measured acceleration $\alpha_m(t)$ will be small because the vehicle 14 is not moving. In a step 314 the difference between the first and second measured accelerations $\alpha_m(t)$ is used to distinguish between the accelerometer bias $\beta_I$ and an effect from gravity g for a parking incline angle of the ground 25.

The apparatus 10,12 in a step 316 uses the just calculated accelerometer bias $\beta_I$ and pre-selected estimates of position offset L and yaw alignment angle $\gamma$ for determining a start altitude $H_1$. In a step 318 the vehicle 14 is rapidly driven in a clockwise (or counterclockwise) loop back to the parking space. The driving must be fast enough to cause a yaw angle rate $\omega(t)$ similar to the yaw angle rates $\omega(t)$'s that will be encountered in operation. In a step 322 a first return to position (RTP) altitude $H_{R1}$ is determined. In a step 324 the vehicle 14 is expeditiously driven in the opposite direction loop back to the parking space. The driving must be fast enough to cause a yaw angle rate $\omega(t)$ similar to the yaw angle rates $\omega(t)$'s that will be encountered in operation. In a step 326 a second return to position (RTP) altitude $H_{R2}$ is determined. In the step 328 the effective installation position offset L and yaw alignment angle γ are calculated from the start altitude $H_1$, first RTP altitude $H_{R1}$ and second RTP altitude $H_{R2}$ using equations 2 and 3 below. The step 328 determines the accelerometer bias $\beta_I$, the position offset L and the yaw alignment angle γ for the sum of the altitude changes ΔH's to be zero between the start altitude $H_1$ and the first loop altitude $H_{R1}$ and between the first loop altitude $H_{R1}$ and the second loop altitude $H_{R2}$; or determines the accelerometer bias $\beta_I$, the position offset L and the yaw alignment angle γ that equalizes the start altitude $H_1$, the first loop altitude $H_{R1}$ and the second loop altitude $H_{R2}$.

Determination of Altitude and Incline Angle

The following section shows the operation of the apparatus 10,12 for a calculation of altitude change ΔH and incline angle Θ. The equation 2 shows a calculation of altitude change ΔH based on compensated acceleration $\alpha_c(t)$ and speed v(t) for a measurement time ΔT and the gravity acceleration constant g.

$$\Delta H = \left\{ \int_0^{\Delta T} \alpha_c(t)v(t)dt - (1/2)[v^2(\Delta T) - v^2(0)] \right\}(1/g)$$

The equation 3 shows the compensated acceleration $\alpha_c(t)$ as a function of measured acceleration $\alpha_m(t)$, accelerometer bias β, positional yaw rate error $\omega^2(t) \times L$, and an alignment yaw rate error $\omega(t) \times v(t) \times \gamma$.

$$\alpha_c(t) = \alpha_m(t) + \beta - \omega^2(t)L - \omega(t)v(t)\gamma \quad\quad 3)$$

The positional yaw rate error is the same for either left or right turns. The alignment yaw rate error is equal and opposite for left and right turns. The equation 4 shows the incline angle Θ as a function compensated acceleration $\alpha_c(t)$ and rate of change of speed versus time Δv/Δt.

$$\Theta = \mathrm{Sin}^{-1}\{[(\alpha_c(t) - \Delta v/\Delta t]/g\} \quad\quad 4)$$

General Benefits

An embodiment may improve the performance of a vehicle navigation apparatus that comprises a GPS receiver, yaw rate gyro or heading gyro, transmission shaft or wheel speed measurement device, and optionally a map-match capability. An embodiment may add a forward direction linear accelerometer and several accelerometer compensation algorithms to improve the precision of this apparatus to preferably within a meter or two, without a requirement for differential GPS measurements; and to provide continuous and smooth altitudes and incline angles without a requirement for continuous or smooth GPS measurements.

It is well-known that GPS latitude and longitude measurements are correlated to errors in altitude. By improving knowledge of altitude, the latitude and longitude knowledge may be improved through these correlations. In obstructed view situations, the GPS velocity may be noisy, or the geometry (DOP) of the GPS satellite signals may be poor, or only three GPS satellite signals may be available. In such cases the improved altitude measurement makes a significant improvement in latitude and longitude measurements.

Direct knowledge of the altitude that may be better than GPS accuracy is used in combination with a map-matching data base that includes altitude information. Using precise altitude or altitude change information, a map-match algorithm can quickly determine whether the vehicle is on one of two parallel tracks at a highway off-ramp, one of which is rising or falling and one of which is not. Using GPS and heading gyro alone may not produce the required accuracy to make such a determination until a substantial distance has been traveled, to the point that the two possible paths are separated horizontally in the map-match data base by a distance commensurate with the GPS accuracy. Knowledge of whether the vehicle has left the highway is critical in determining routing information promptly. Direct knowledge of altitude can also establish the vertical location of the vehicle when in a multi-floor parking structure with no GPS coverage or imprecise GPS-based altitudes.

Figure 9B:
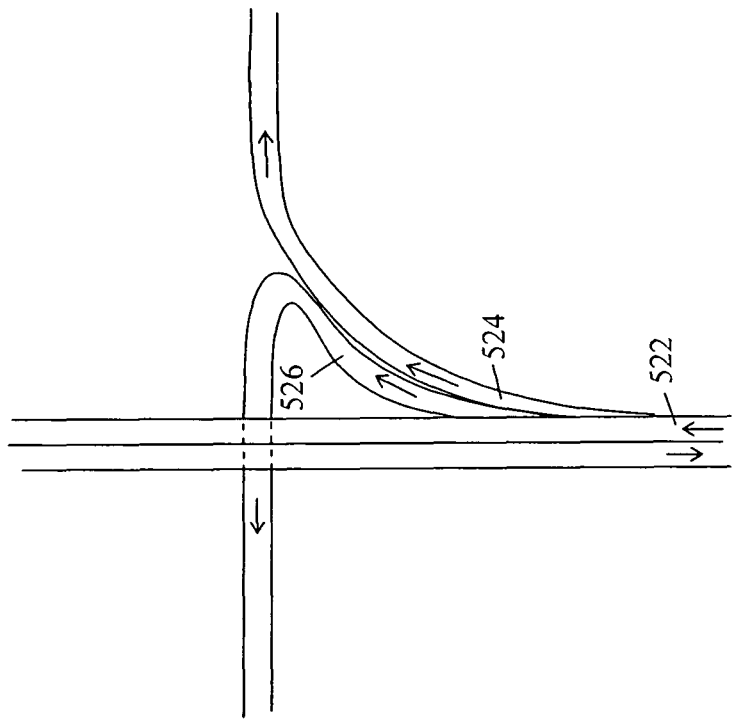
FIGS. 9A and 9B illustrate floors of a parking garage and highway connecting ramp roads where the dead reckoning altimeter and/or the inclinometer of FIG. 1 is beneficially used.
Figure 9A:
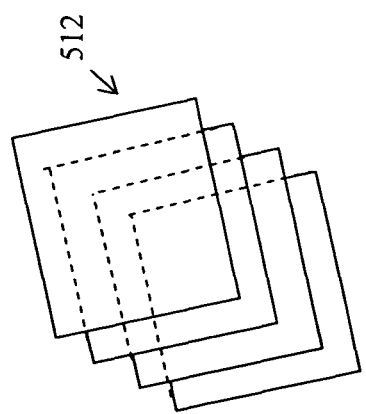

FIG. 9A illustrates floors 512 of a parking garage where the DR altitude H is used to distinguish between the floors 512 connected by a spiraling ramp when the floors 512 are not reliably distinguished by a GNSS-based altitude.

FIG. 9B illustrates a highway 522, an upward connecting road ramp 524 and a downward connecting road ramp 526 wherein the measurement of incline angle θ distinguishes between the upward ramp road 524 and the downward ramp road 526 when the ramp roads are not reliably distinguished by the GNSS-based heading.

Automatic Calibration of Accelerometer Bias β and Position Offset L

Figure 10:
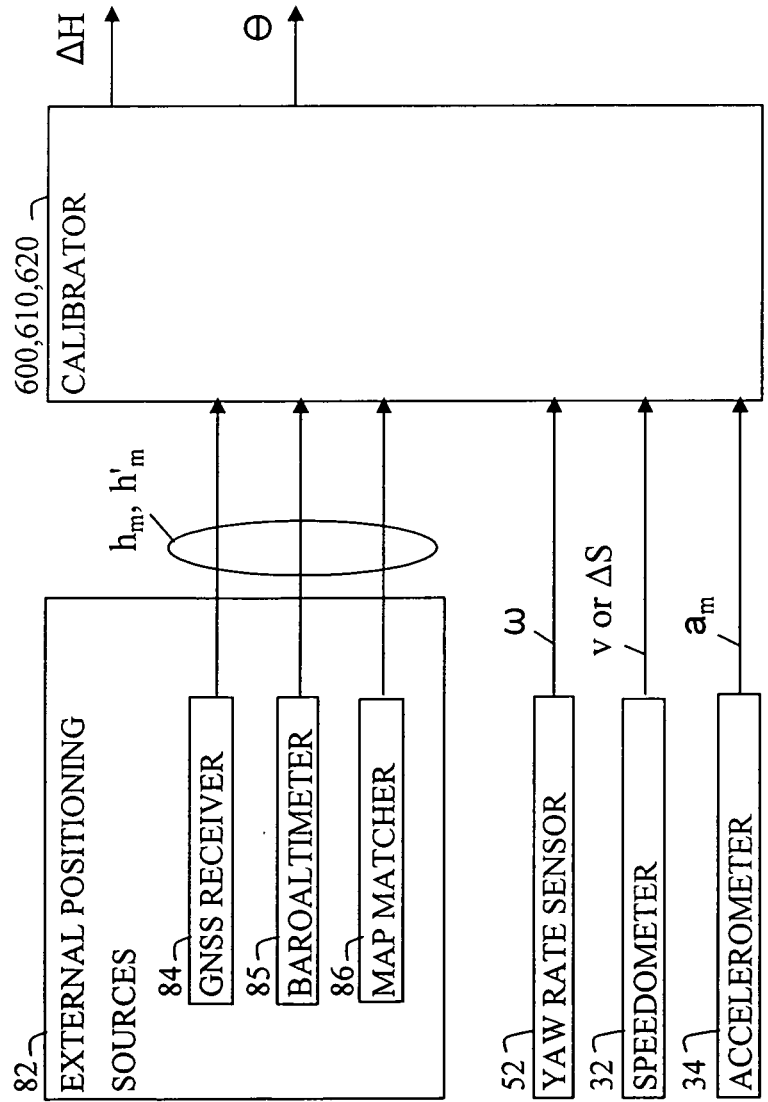
FIG. 10 is a block diagram showing a calibrator for the altimeter and inclinometer of FIG. 1.

FIG. 10 shows a calibrator 600, 610, 620 integrated into the altimeter 10 and inclinometer 12 for automatic calibration of the accelerometer bias β and the position offset L.

To compute altitude change ΔH accurately, we calibrate the accelerometer bias β which changes with time, and the position offset L which is usually constant with time. The calibration would also calibrate any position offset L that changed with time. It has been noted above that a DR altitude is determined by accumulating ΔH's onto a prior determination of altitude. The calibration eliminates the need for the installation accelerometer bias $\beta_I$ and the restart accelerometer bias $\beta_0$, that are described above. This calibration eliminates all need to make any initial estimate or have any prior knowledge or any separate measurement for the accelerometer bias β or the accelerometer position offset L. Those skilled in the art know that the idea of forward acceleration as described herein is sometimes called proper acceleration or specific force.

The external altitude $H_{EXT}$ from the external altitude source 82 is described below as a measured altitude $h_m$. A rate of change $h'_m$ (altitude rate) of measured altitude $h_m$ may be derived as a change $\Delta h_m$ in the measured altitude $h_m$ for a time Δt or may be directly available from a Doppler signal measurement in a vertical direction or from a GNSS vertical Doppler measurement from the GNSS receiver 84. The external altitude information used by the calibrators 600, 610, 620 may be the measured altitude $h_m$ or altitude rate $h'_m$ or both.

Figure 11A:
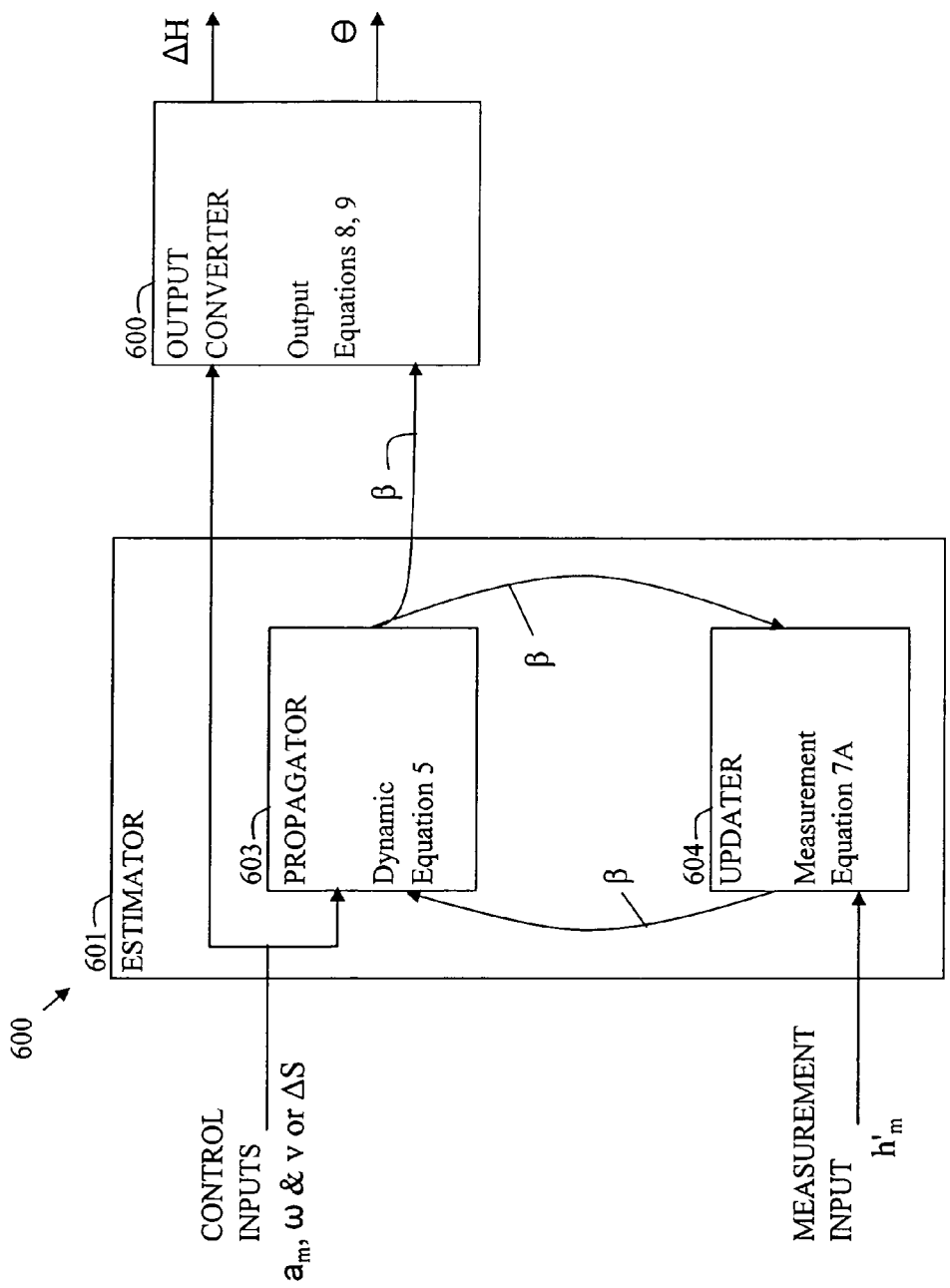
FIGS. 11A, B and C are block diagrams of first, second and third embodiments for the calibrator of FIG. 10.

FIG. 11A shows a calibrator 600 that may be integrated with the DR altimeter 10 and the DR inclinometer apparatus 12 to provide automatic calibration of accelerometer bias β. The calibrator 600 performs the functions of an estimator 601 and an output converter 602.

The estimator 601 can be implemented with a one state Kalman filter described as follows. The one state Kalman filter has a state for a recursive estimate $\beta_e$ of the accelerometer bias β. A propagator 603 for the Kalman filter and an updater 604 for the Kalman filter act together to make recursive estimates for the state. The propagator 603 receives control inputs for forward acceleration, yaw angel rate and forward speed and the updater 604 receives a measurement input for an external altitude rate. The propagator 603 processes the information in the control inputs and the state of the estimate of the accelerometer bias β according to a dynamic model equation in order to propagate the state. The updater 604 processes the information in the measurement input and the state of estimate of the accelerometer bias β according to a measurement model equation in order to update the state. The effect is that the propagator 603 and the updater 604 interconnect with each other to make recursive estimates for the accelerometer bias β.

The output converter 602 processes the information in the control inputs and the state of the estimate of the accelerometer bias β, according to output model equations to provide outputs for change in altitude ΔH and incline angle Θ.

One state Kalman Filter

Control Inputs
  forward acceleration $\alpha_m$; noise $v_a$ with noise variance $q_a$
  yaw angle rate ω
  speed v or distances and times for change ΔS in distance for a change Δt in time (may be determined from backwards differenced speedometer).
Measurement Inputs
  altitude rate $h'_m = (\Delta h/\Delta t)_m$; noise $v'_h$, with noise variance $r'_h$ ($h'_m$ is an altitude rate received from an external positioning source or derived by differencing altitudes $h_m$ received from an external positioning source with respect to Δt or ΔS).
States for One State Kalman Filter
  accelerometer bias β(t); varies slowly with time; variation modeled as a Marko process $w_\beta$ with noise variance $q_\beta$
Dynamic Equations (State Propagation from Control Inputs)

$$\Delta\beta/\Delta t = 0 + w_\beta \tag{5}$$

Measurement equations (G=local gravitational acceleration)

$$h'_m = v(a_m + \beta_e - \omega^2 L_0 - \Delta v/\Delta t + v_a)/G + v'_h \tag{7A}$$

Output Conversion Equations
  ΔH from reference time point to $t_0$ current time $t_1$.

$$\Delta H = \{\int v(t)(a_m(t) + \beta(t) - \omega^2(t)L_0)dt - \tfrac{1}{2}[v_1^2 - v_0^2]\}/G \tag{8}$$

where the integral is computed from time $t_0$ to $t_1$.
  The instantaneous inclination angle is also available as $$\Theta = \arcsin(\Delta H/\Delta s) \text{ or } \arcsin(\Delta H/(v\Delta t)) \tag{9}$$

over short distances Δs or short time periods Δt.)

Figure 11B:
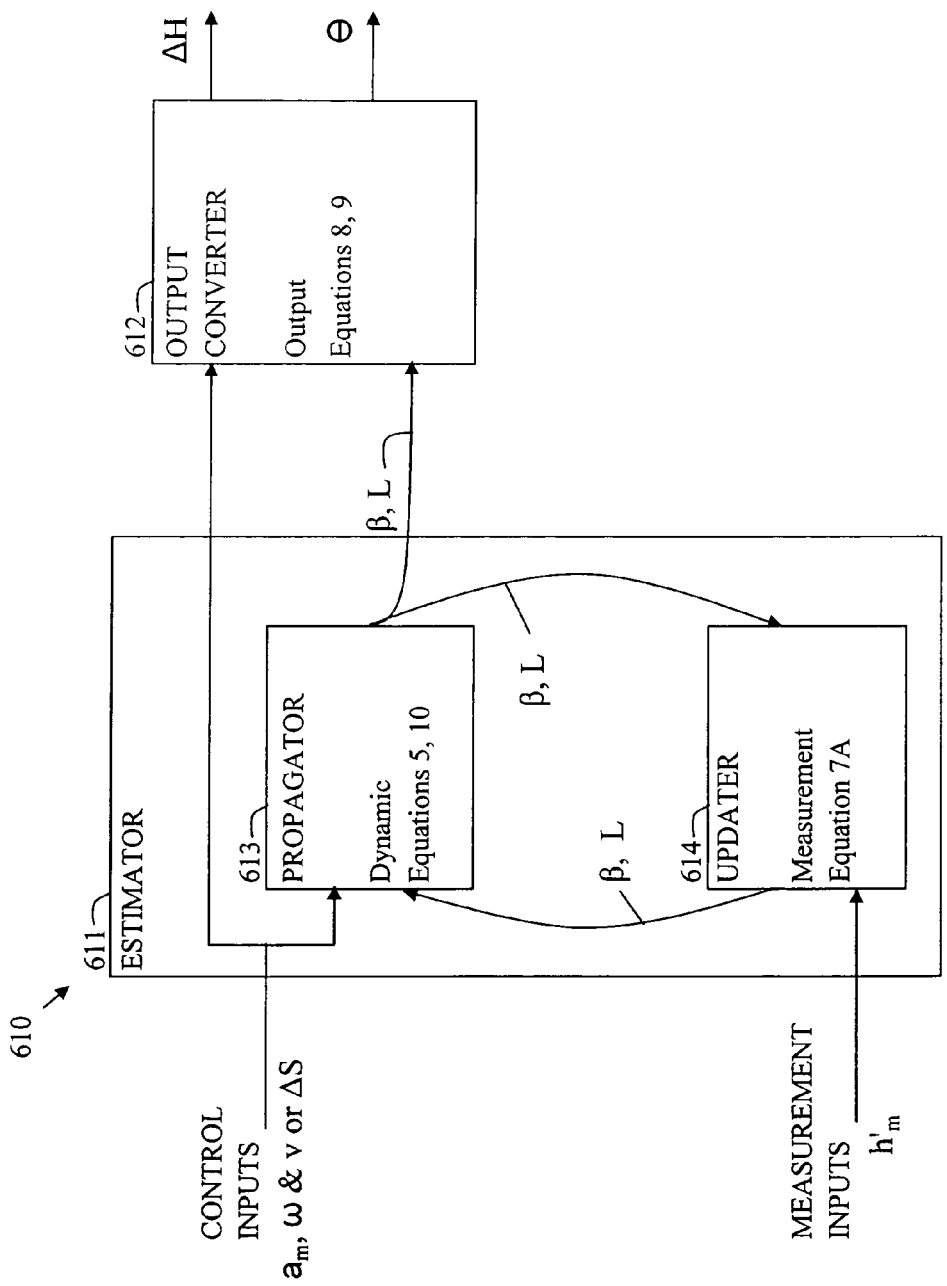

FIG. 11B shows a calibrator 610 that may be integrated with the DR altimeter 10 and the DR inclinometer apparatus 12 to provide automatic calibration of accelerometer bias β and position offset L. The calibrator 610 performs the functions of an estimator 611 and an output converter 612.

The estimator 611 can be implemented with a two state Kalman filter described as follows. The two state Kalman filter has a state for a recursive estimate $\beta_e$ of the accelerometer bias β and a state for a recursive estimate $L_e$ of the position offset L. A propagator 613 for the Kalman filter and an updater 614 for the Kalman filter act together to make the recursive estimates for the states. The propagator 613 receives control inputs for forward acceleration, yaw angel rate and forward speed and the updater 614 receives a measurement input for an external altitude rate. The propagator 613 processes the information in the control inputs and the states of the estimates of the accelerometer bias β and the position offset L according to dynamic model equations in order to propagate the states. The updater 614 processes the information in the measurement inputs and the states of estimates of the accelerometer bias β and the position offset L according to a measurement model equation in order to update the states. The effect is that the propagator 613 and the updater 614 interconnect with each other to make recursive estimates for the accelerometer bias β and the position offset L.

The output converter 612 processes the information in the control inputs and the states of the estimates of the accelerometer bias β and the position offset L according to output model equations to provide outputs for change in altitude ΔH and incline angle Θ.

Two State Kalman Filter

Control Inputs
  forward acceleration $\alpha_m$; noise $v_a$ with noise variance $q_a$
  yaw angle rate ω; noise $v_\omega$ with noise variance $q_\omega$
  forward speed v or change ΔS in distance for a change e Δt in time (as determined from back-wards differenced odometer); noise $v_v$ with noise variance $q_v$.
Measurement Inputs
  altitude rate $h'_m = (\Delta h/\Delta t)_m$; noise $v_{h'}$ with noise variance $r'_h$ ($h'_m$ is an altitude rate received from an external positioning source or derived by differencing altitudes $h_m$ received from an external positioning source with respect to Δt or ΔS).
States for Two State Kalman Filter
  accelerometer bias β(t); varies slowly with time; variation modeled as a Marko process $w_\beta$ with noise variance $q_\beta$
  accelerometer position offset $L_e$, constant
Dynamic Model (State Propagation from Control Inputs)

$$\Delta\beta/\Delta t = 0 + w_\beta \tag{5}$$

$$\Delta L/\Delta t = 0 \tag{10}$$

Measurement Model (G=Local Gravitational Acceleration)

$$h'_m = v(a_m + \beta - \omega^2 L - \Delta v/\Delta t)/G + v_{h'} \tag{7A}$$

Output Conversion Equations
  ΔH from reference time point to $t_0$ current time $t_1$.

$$\Delta H = \left\{ \int v(t)(a_m(t) + \beta(t) - \omega^2(t)L)dt - \frac{1}{2}[v_1^2 - v_0^2] \right\}/G \tag{8}$$

where the integral is computed from time $t_0$ to $t_1$.
  The instantaneous inclination angle is also available as $$\Theta = \arcsin(\Delta H/\Delta s) \text{ or } \arcsin(\Delta H/(v\Delta t)) \tag{9}$$

over short distances Δs or short time periods Δt.)
  Observability of the states is guaranteed from the history of $h'_m$ measurements, provided that there is sufficient movement of the vehicle 14.

An error in the estimate of β will cause the calculated $h'_m$ to be biased by an amount proportional to the product of the error in the estimate and the speed. The value of β requires forward motion to be observable, and becomes more observable as more distance is traveled while $h'_m$ measurements are made, and the error in the estimate will decrease.

An error in the estimate of L will cause the calculated $h'_m$ to be biased by an amount proportional to the product of the error in the estimate and the quantity $\omega^2 *v$. The value of L requires left or right turns to be observable, and becomes more observable as more turns accumulate (especially high-rate turns) while $h'_m$ measurements are made, and the error in the estimate will decrease.

Figure 11C:
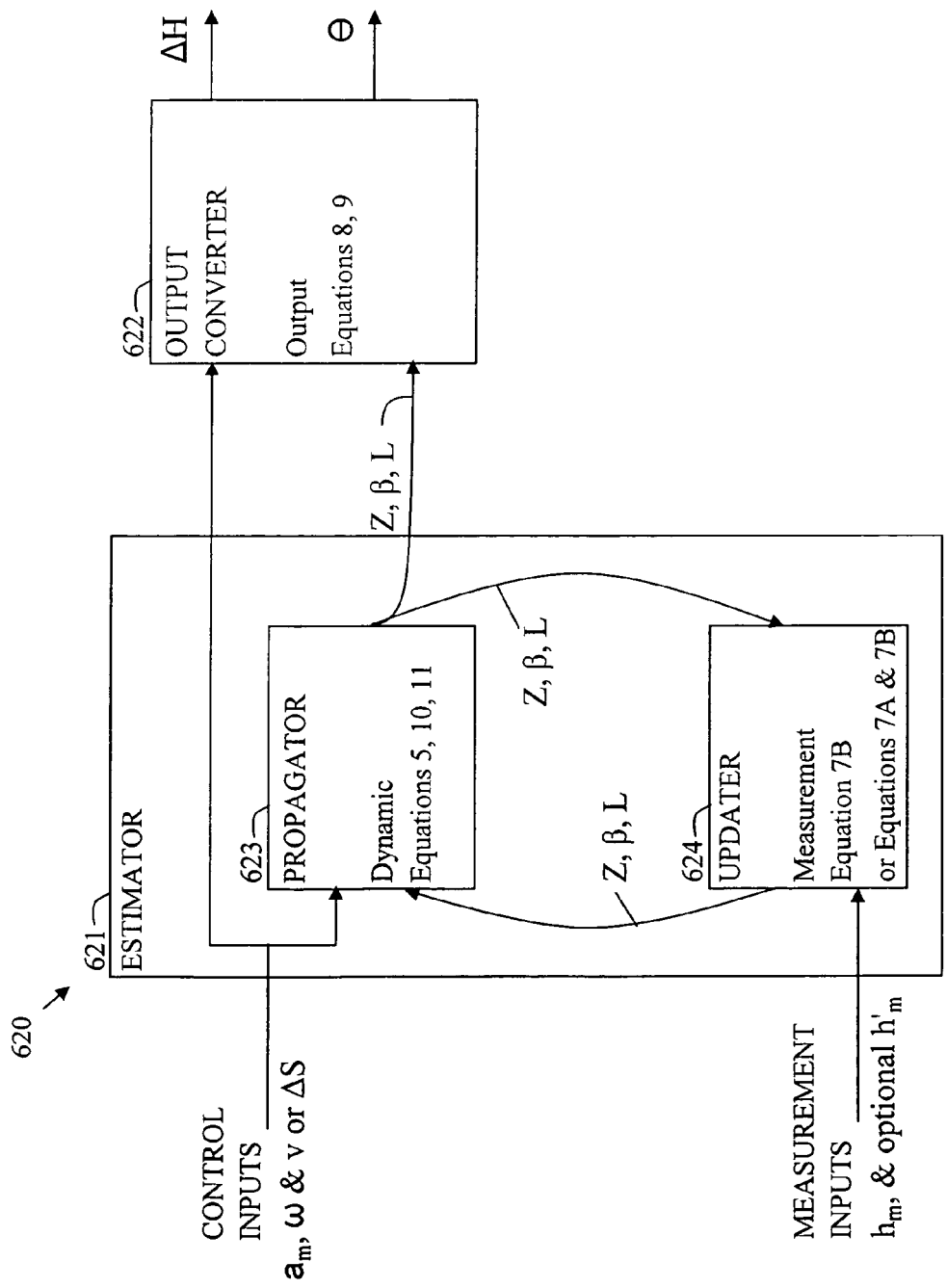

FIG. 11C shows a calibrator 620 that may be integrated with the DR altimeter 10 and the DR inclinometer apparatus 12 to provide automatic calibration of accelerometer bias $\beta$ and position offset L. The calibrator 620 performs the functions of an estimator 621 and an output converter 622.

The estimator 621 can be implemented with a three state Kalman filter described as follows. The three state Kalman filter has a state for a recursive estimate $\beta_e$ of the accelerometer bias $\beta$, a state for a recursive estimate $L_e$ of the position offset L, and a state for a recursive estimate $Z_e$ of a model altitude Z. A propagator 623 for the Kalman filter and an updater 624 for the Kalman filter act together to make the recursive estimates for the states. The propagator 623 receives control inputs for forward acceleration, yaw angel rate and forward speed and the updater 624 receives measurement inputs for an external altitude and optionally an external altitude rate. The propagator 623 processes the information in the control inputs and the states of the estimates of the accelerometer bias $\beta$, the position offset L, and the model altitude Z according to dynamic model equations in order to propagate the states. The updater 624 processes the information in the measurement inputs and the states of estimates of the accelerometer bias $\beta$, the position offset L, and the model altitude Z according to measurement model equations in order to update the states. The effect is that the propagator 623 and the updater 624 interconnect with each other to make recursive estimates for the accelerometer bias $\beta$, the position offset L, and the model altitude Z. The state of the model altitude Z may be viewed as a catalyst for the calibration of the accelerometer bias $\beta$ and the position offset L.

The output converter 622 processes the information in control inputs and the states of the estimates of the accelerometer bias $\beta$ and the position offset L according to output model equations to provide outputs for change in altitude $\Delta H$ and incline angle $\Theta$.

Three State Kalman Filter

Control Inputs
forward acceleration $a_m$; sensor noise $v_a$ with noise variance $q_a$
yaw angle rate $\omega$; sensor noise $v_\omega$ with noise variance $q_\omega$
forward speed v (as measured by a speedometer or from back-wards differenced odometer ($\Delta S$ traveled in distance for a change $\Delta t$ in time); sensor noise $v_v$ with noise variance $q_v$ States for Three State Kalman Filter
model altitude Z (altitude $h_m$ of external positioning source smoothed by Kalman Filter)
accelerometer bias $\beta(t)$; varies slowly with time; variation modeled as a Marko process $w_\beta$ with noise variance $q_\beta$
accelerometer position offset L, constant Measurement Inputs
altitude $h_m$; noise $v_h$ with noise variance $r_h$ ($h_m$ is an altitude received from an external positioning source)
altitude rate $h'_m$; optional is available; sensor noise $v_{h'}$ with noise variance $r_{h'}$ ($h'_m$ is an altitude rate received from an external positioning source)

Dynamic Model (State Propagation from Control Inputs, G=Local Gravitational Acceleration)

$$\Delta\beta/\Delta t = 0 + w_\beta \tag{5}$$

$$\Delta L/\Delta t = 0 \tag{10}$$

$$\Delta Z/\Delta t = v(a_m + \beta - \omega^2 L - \Delta v/\Delta t + v_a)/G \tag{11}$$

Measurement Model $$h_m = Z + v_h, \tag{7B}$$

Optional measurement model (use both $h_n$, and $h'_m$ if $h'_m$ is available)

$$h'_m = v(a_m + \beta - \omega^2 L - \Delta v/\Delta t)/G + v_{h'} \tag{7A}$$

$$h_m = Z + v_h \tag{7B}$$

Output Conversion Equations

The change in altitude $\Delta H$ from reference time point $t_0$ to current time $t_1$ is computed as a function of the control inputs where the integral is computed from time $t_0$ to $t_1$.

$$\Delta H = \left\{ \int v(t)(a_m(t) + \beta(t) - \omega^2(t)L)dt - \frac{1}{2}[v_1^2 - v_0^2] \right\} / G \tag{8}$$

The instantaneous inclination angle is also available as $$\Theta = \arcsin(\Delta H/\Delta s) \text{ or } \arcsin(\Delta H/(v\Delta t)) \tag{9}$$

over short distances $\Delta s$ or short time periods $\Delta t$.)

Observability of the states is guaranteed from the history of $h_m$ measurements, provided that there is sufficient movement of the vehicle.

The state Z is directly measured by $h_m$ measurements, and is thus observable.

An error in the estimate of $\beta$ will cause the estimated Z to drift relative to the measurements $h_m$ by an amount proportional to the product of the error in the estimate of $\beta$ and the distance traveled. The value of $\beta$ requires forward motion to be observable, and becomes more observable as more distance is traveled while $h_m$ measurements are made.

An error in the estimate of L will cause the estimated Z to drift relative to the measurements $h_m$ by an amount proportional to the product of the error in the estimate of L and the accumulation of the product of $v^*w^2$. The value of L requires turns to be observable, and becomes more observable as more turns accumulate (especially high-rate turns) while $h_m$ measurements are made.

In general, the external measurements of the altitude information $h_m$ and/or $h'_m$ are intermittent, i.e. not continuously available for the measurement inputs. For example the external altitude information $h_m$ and/or $h'_m$ derived with the GNSS receiver 84 is not available during time periods when the GNSS signals are blocked. The updater 604,614,624 does not update estimates of the states $\beta$ or L when it does not receive new measurement input information for $h_m$ and/or $h'_m$. However, the propagator 603,613,623 continues to propagate the state estimates to the output converter 602,612,622. The output converter 602,612,622 uses the continuous sensor measurements being received in the control inputs for velocity v, acceleration $\alpha_m$ and yaw angle rate $\omega^2$ and the propagated state estimates to provide continuous outputs of the change in altitude $\Delta H$ and/or the incline angle $\Theta$.

Figure 12:
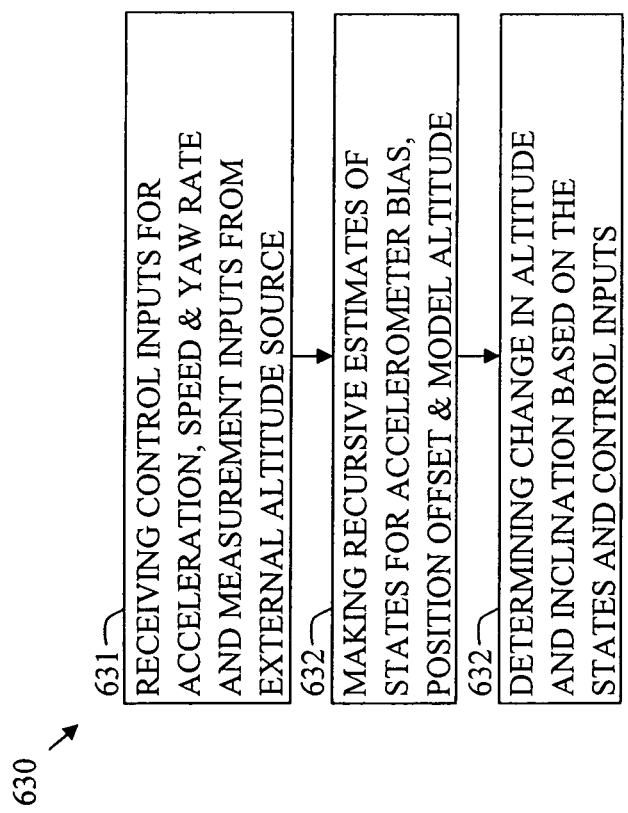
FIG. 12 is a flow chart of a method for calibration.

FIG. 12 is a flow chart of a calibration method for an altimeter or an inclinometer. The steps of the method may be contained in computer readable memory on a tangible medium 630 as a set of instructions for causing a computer processor to carry out the steps. In a step 631 a calibrator receives information in control inputs and measurement inputs. In a step 632 the calibrator uses the control and measurement input information for making recursive estimates of one or more states. In a step 633 the calibrator uses the control inputs information and the states for determining a change in altitude and/or an inclination angle. These steps are described in detail in the detailed descriptions of the calibrators 600, 601 & 602.

It is to be understood that the embodiments that are described above are exemplary, not limiting. Various combinations, supersets, subsets and equivalents of these exemplary embodiments will no doubt become obvious to those skilled in the art after having read the above disclosure. However, these combinations, supersets, subsets and equivalents should not be regarded as limiting. Accordingly, it is the claims written below that show the true limitations, spirit and scope of the present invention.

The invention claimed is:

1. An inclinometer, comprising:
an estimator configured to use a forward speed, a yaw angle rate, a forward acceleration and external altitude information in order to estimate an error in said acceleration due to an accelerometer bias without a requirement for an initial estimate of said accelerometer bias; and
an output converter configured to use said forward speed, said yaw angle rate, said forward acceleration and said estimated accelerometer bias to calculate an inclination angle.

2. The inclinometer of claim 1, wherein:
the estimator and the output converter are configured to provide new calculations of said inclination angle based on said estimated accelerometer bias and new information for said forward speed, said yaw angle rate and said forward acceleration for a time period when said external altitude information is not continuous.

3. The inclinometer of claim 1, wherein:
the estimator is further configured to use said forward speed, said yaw angle rate, said forward acceleration and said external altitude information to estimate a position offset with respect to a turn center of a vehicle carrying an accelerometer configured to provide said acceleration without a requirement for an initial estimate of said position offset; and
the output converter is further configured to use said estimated position offset to calculate of said inclination angle.

4. The inclinometer of claim 3, wherein:
the output converter is configured to use a product of said estimated position offset times a square of said yaw angle rate to calculate said inclination angle.

5. The inclinometer of claim 3, wherein:
the estimator is configured to use said forward speed, said yaw angle rate, said forward acceleration and said external altitude information to estimate a model altitude for said external altitude information, and use said estimated model altitude to estimate said accelerometer bias and said position offset.

6. The inclinometer of claim 5, wherein:
said external altitude information is an external altitude or an external altitude rate from an external positioning source.

7. The inclinometer of claim 3, wherein:
the estimator includes a propagator and updater to make recursive estimates of states of said estimated position offset and said estimated accelerometer bias; said propagator configured to use said forward speed, said yaw angle rate and said forward acceleration with said states to propagate said states; and said updater configured to use said external altitude information with said states to update said states.

8. The inclinometer of claim 3, wherein:
the estimator includes a propagator and updater to make recursive estimates of states of said estimated position offset, said estimated accelerometer bias and a model altitude for said external altitude information; said propagator configured to use said forward speed, said yaw angle rate and said forward acceleration with said states to propagate said states; and said updater configured to use said external altitude information with said states to update said states.

9. The inclinometer of claim 1, wherein:
the estimator includes a propagator and updater to make recursive estimates of a state of said estimated accelerometer bias; said propagator configured to use said forward speed, said yaw angle rate and said forward acceleration with said state to propagate said state; and said updater configured to use said external altitude information with said state to update said state.

10. The inclinometer of claim 1, further comprising:
a yaw rate sensor to provide information for said yaw angle rate;
a linear accelerometer to provide information for said acceleration; and
an external positioning source to provide said external altitude information.

11. A method for determining inclination angle, compromising:
using a forward speed, a yaw angle rate, a forward acceleration and external altitude information for estimating an error in said acceleration due to an accelerometer bias without a requirement for an initial estimate of said accelerometer bias; and
using said forward speed, said yaw angle rate, said forward acceleration and said estimated accelerometer bias for determining an inclination angle.

12. The method of claim 11, wherein:
the step of estimating includes providing new determinations of said inclination angle based on said estimated accelerometer bias and new information for said forward speed, said yaw angle rate and said forward acceleration for a time period when said external altitude information is not continuous.

13. The method of claim 11, wherein:
the step of estimating includes using said forward speed, said yaw angle rate, said forward acceleration and said external altitude information for estimating a position offset with respect to a turn center of a vehicle carrying an accelerometer configured for providing said acceleration without a requirement for an initial estimate of said position offset; and the step of determining includes using said estimated position offset for determining said inclination angle.

14. The method of claim 13, wherein:
the step of determining includes calculating a product for said estimated position offset times a square of said yaw angle rate and using said product for determining said inclination angle.

15. The method of claim 13, wherein:
the step of estimating includes using said forward speed, said yaw angle rate, said forward acceleration and said external altitude information for estimating a model altitude for said external altitude information, and using said estimated model altitude for estimating said accelerometer bias and said position offset.

16. The method of claim 15, wherein:
said external altitude information is an external altitude or an external altitude rate from an external positioning source.

17. The method of claim 13, wherein:
the step of estimating includes making recursive estimates of said estimated position offset and said estimated accelerometer bias by using said forward speed, said yaw angle rate and said forward acceleration with said states for propagating said states; and using said external altitude information with said states for updating said states.

18. The method of claim 13, wherein:
the step of estimating further includes making recursive estimates of said estimated position offset, said estimated accelerometer bias and a model altitude for said external altitude information by using said forward speed, said yaw angle rate and said forward acceleration with said states for propagating said states; and using said external altitude information with said states for updating said states.

19. The method of claim 11, wherein:
the step of estimating includes making recursive estimates of a state of said estimated accelerometer bias by using said forward speed, said yaw angle rate and said forward acceleration with state for propagating said state, and using said external altitude information with said state for updating said state.

20. The method of claim 11, further comprising:
receiving information for said yaw angle rate from a yaw rate sensor;
receiving information for said acceleration from a linear accelerometer; and
receiving said external altitude information from an external positioning source.

* * * * *